United States Patent
Cudak et al.

(10) Patent No.: US 11,294,978 B2
(45) Date of Patent: Apr. 5, 2022

(54) REMEDIAL ACTIONS FOR IMPERMISSIBLE SOCIAL MEDIA CONTENT

(71) Applicant: Lenovo (Singapore) Pte. Ltd., Singapore (SG)

(72) Inventors: Gary David Cudak, Wake Forest, NC (US); Nathan J. Peterson, Oxford, NC (US); Amy Leigh Rose, Chapel Hill, NC (US); Jennifer Lee-Baron, Morrisville, NC (US); John Scott Crowe, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/588,640

(22) Filed: Sep. 30, 2019

(65) Prior Publication Data

US 2021/0097118 A1  Apr. 1, 2021

(51) Int. Cl.
| | | |
|---|---|---|
| *G06F 15/173* | (2006.01) | |
| *G06F 16/9535* | (2019.01) | |
| *G06F 16/9536* | (2019.01) | |
| *H04L 67/306* | (2022.01) | |
| *G06F 16/9032* | (2019.01) | |
| *H04L 29/06* | (2006.01) | |
| *G06F 16/909* | (2019.01) | |

(52) U.S. Cl.
CPC ........ *G06F 16/9535* (2019.01); *G06F 16/909* (2019.01); *G06F 16/90332* (2019.01); *G06F 16/9536* (2019.01); *H04L 63/101* (2013.01); *H04L 67/306* (2013.01)

(58) Field of Classification Search
CPC ............... G06F 16/9535; G06F 16/909; G06F 16/90332; G06F 16/9536; H04L 63/101; H04L 67/306
USPC ......................................... 709/205, 223, 224
See application file for complete search history.

(56) References Cited

U.S. PATENT DOCUMENTS

| | | | | |
|---|---|---|---|---|
| 9,413,809 B1* | 8/2016 | Morse | ..................... | H04W 4/14 |
| 10,277,663 B1* | 4/2019 | Andaz | ..................... | H04L 51/08 |
| 10,600,085 B2* | 3/2020 | Rodriguez | ......... | G06Q 30/0257 |
| 2011/0314098 A1* | 12/2011 | Farrell | ................... | G06Q 10/10 709/204 |
| 2013/0013700 A1* | 1/2013 | Sittig | ..................... | G06Q 10/10 709/206 |
| 2016/0027052 A1* | 1/2016 | Rodriguez | ......... | G06Q 30/0257 705/14.55 |

(Continued)

OTHER PUBLICATIONS

Jason Fitzpatrick, "How to Review and Approve What appears On Your Facebook Timeline", Jun. 10, 2016, How-To-Geek, pp. 1-10, https://www.howtogeek.com/258370/how-to-review-and-approve-what-appears-on-your-facebook-timeline/ (Year: 2016).*

*Primary Examiner* — Liang Che A Wang

(74) *Attorney, Agent, or Firm* — Ference & Associates LLC

(57) ABSTRACT

One embodiment provides a method, including: identifying an aspect present in media content, wherein the aspect is associated with a user; determining, using a processor, whether the aspect is compatible with user permissions delineated in a user profile associated with the user; and performing, responsive to determining that the aspect of the media content is not compatible with the user permissions, a remedial action. Other aspects are described and claimed.

18 Claims, 3 Drawing Sheets

(56) References Cited

U.S. PATENT DOCUMENTS

2018/0351895 A1* 12/2018 Rathod .................... G06F 9/54
2020/0349133 A1* 11/2020 Dwarampudi ...... G06F 16/1734

* cited by examiner

REMEDIAL ACTIONS FOR IMPERMISSIBLE SOCIAL MEDIA CONTENT

BACKGROUND

Individuals frequently capture and share memorable moments in their lives with others. For example, various types of media content (e.g., images, videos, audio, etc.) may be captured or created and thereafter uploaded to one or more social media platforms. Once uploaded, other individuals may utilize their information handling devices ("devices"), for example, smart phones, tablets, laptop and/or personal computers, and the like, to access, view, and/or provide comments on the uploaded content.

BRIEF SUMMARY

In summary, one aspect provides a method, comprising: identifying an aspect present in media content, wherein the aspect is associated with a user; determining, using a processor, whether the aspect is compatible with user permissions delineated in a user profile associated with the user; and performing, responsive to determining that the aspect of the media content is not compatible with the user permissions, a remedial action.

Another aspect provides an information handling device, comprising: a processor; a memory device that stores instructions executable by the processor to: identify an aspect present in media content, wherein the aspect is associated with a user; determine whether the aspect is compatible with user permissions delineated in a user profile associated with the user; and perform, responsive to determining that the aspect of the media content is not compatible with the user permissions, a remedial action.

A further aspect provides a product, comprising: a storage device that stores code, the code being executable by a processor and comprising: code that identifies an aspect present in the media content, wherein the aspect is associated with a user; code that determines whether the aspect is compatible with user permissions delineated in a user profile associated with the user; and code that performs, responsive to determining that the aspect of the media content is not compatible with the user permissions, a remedial action.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
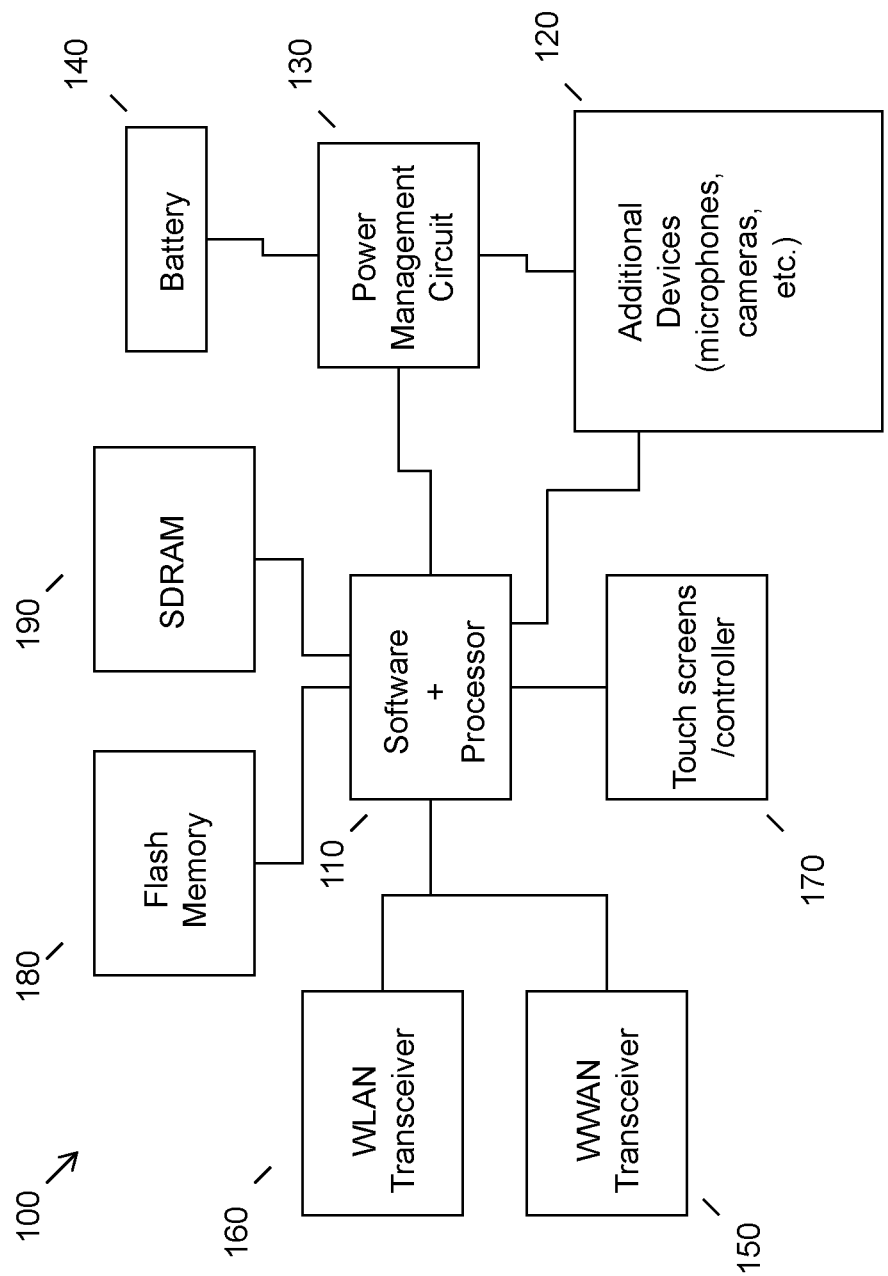
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Social media is pervasive in modern society and has become a valuable tool to share information and to connect individuals together. Using one or more of the many available social media platforms, users are able to upload social media content of themselves or others for other individuals to view. Typically, individuals associated with an upload (e.g., individuals that are present or mentioned in a picture, video, audio recording, etc.) are explicitly tagged by the uploader or dynamically tagged by the social media platform. Once tagged, the uploaded content may appear prominently in the tagged individuals' social media feed and/or their friend's social media feeds.

Occasions arise where an individual may be tagged in content that they would prefer not to be tagged in. More particularly, the individual may be tagged in content associated with an undesirable context, location, object, person, etc. For example, an individual may be tagged in a photo in which they are situated in an unflattering position and/or are surrounded by a plurality of adult beverages. As another example, an individual may be tagged in a video in which they express a polarizing opinion. Being publicly tagged in this type of content may cause harm to an individual's reputation, may invite verbal or physical harassment, damage friendships, and the like.

Conventional solutions for handling the foregoing issue are absolute in nature. For example, to positively ensure that controversial content is not posted, an uploader may simply not upload the content to a social media platform. More particularly, an uploader may review the content and independently determine it is not appropriate to upload. Additionally or alternatively, an individual associated with the content may request that the content not be uploaded. However, in many situations, the requester has no real control over what the uploader will do with the content. Additionally, it is oftentimes the case that the uploader does not notice that the content is controversial in any way (e.g., an uploader may upload a large batch of images at once, an issue that a single individual may have with the content may not be readily apparent to the uploader, etc.).

Accordingly, an embodiment provides a method of selective content scaling that may allow the primary content of the upload to be posted while scaling (e.g., redacting, removing, obscuring, etc.) the unwanted content. In an embodiment, one or more aspects of media content associated with a user may be identified (e.g., one or more individuals, locations, objects, viewpoints, etc.). An embodiment may then determine whether one or more of the identified aspects are compatible with the user permissions stored in a user profile associated with the user. Responsive to determining that they are not, an embodiment may perform a remedial action on the media content (e.g., redacting the incompatible aspect, altering the incompatible aspect, providing a notification to an uploader that an aspect of the media content is incompatible with user permissions, limiting access to the media content, requesting permission from the user to post the media content, etc.). Such a method may dynamically identify and address individualized issues with media content uploaded by others.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
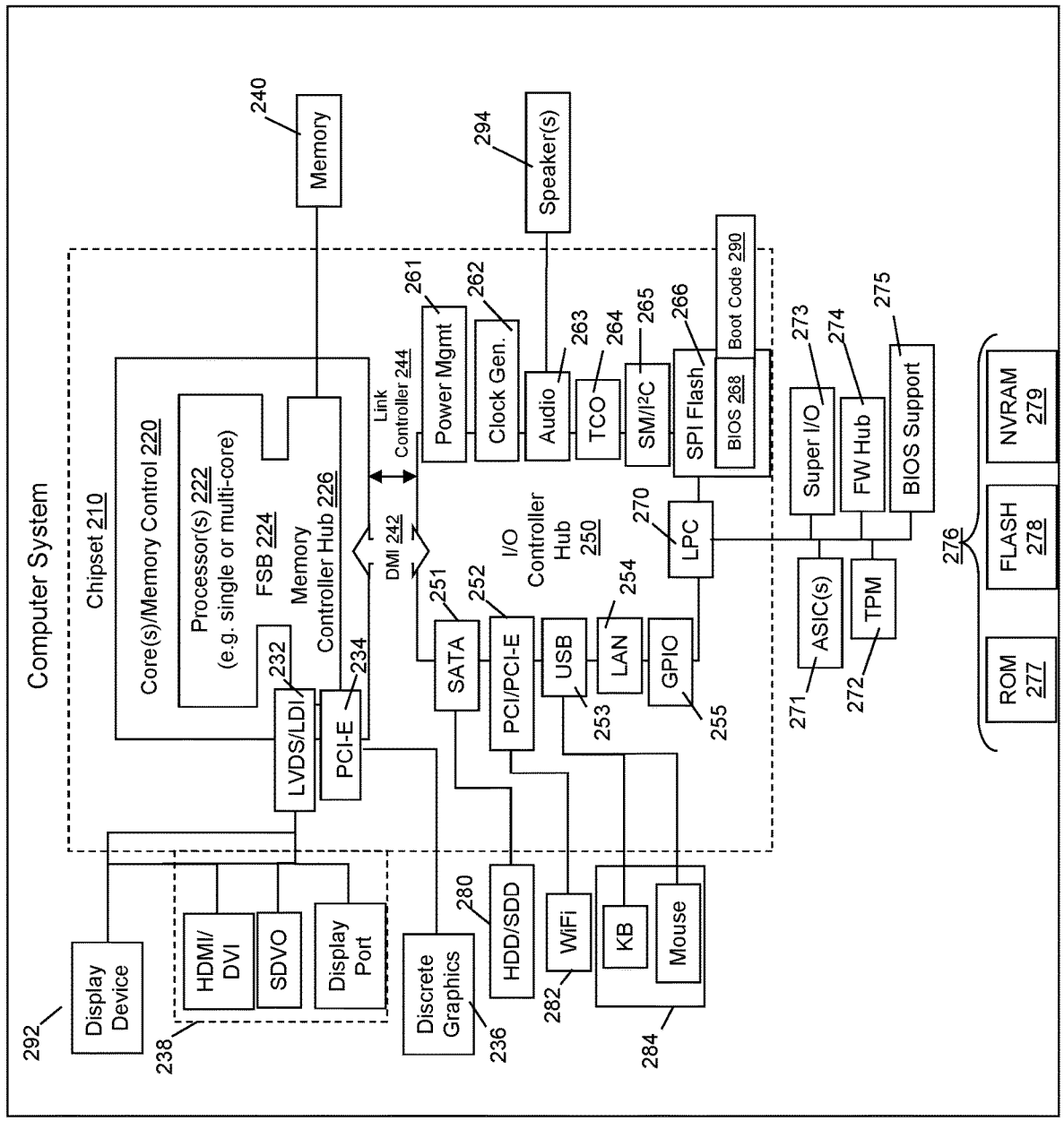
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices capable of accessing and displaying social media content. For example, the circuitry outlined in FIG. 1 may be implemented in a smart phone or tablet embodiment, whereas the circuitry outlined in FIG. 2 may be implemented in a laptop.

Figure 3:
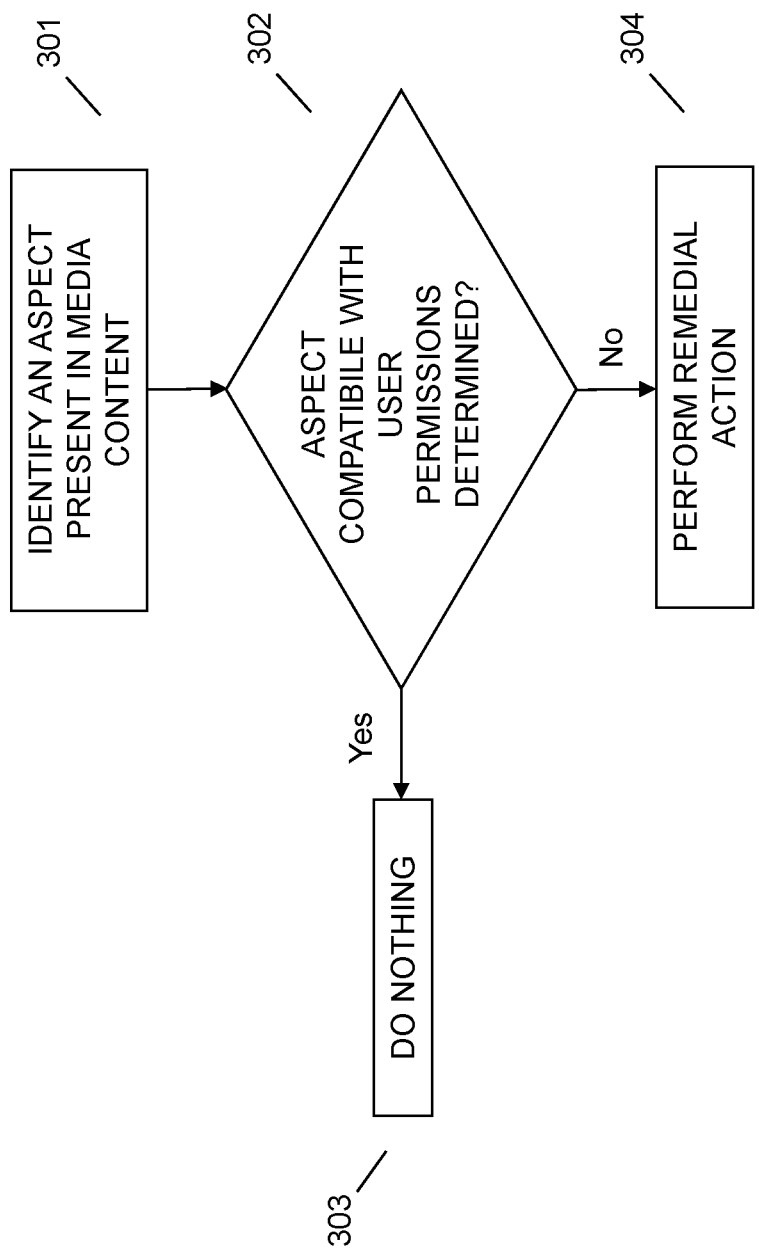
FIG. 3 illustrates an example method of performing a remedial action on media content comprising an incompatible aspect.

Referring now to FIG. 3, an embodiment may dynamically identify an aspect in social media content that is incompatible with a tagged individual's profile permissions and thereafter take a remedial action on the social media content. At 301, an embodiment may identify an aspect associated with an individual that is present in media content. In an embodiment, the media content may be virtually any type of media that can be uploaded to an online or social media platform. For example, the media content may correspond to an image, a video, an audio recording, a text document, a combination of one or more of the foregoing, and the like.

In an embodiment, an individual that is associated with the media content may be identified. The identification of the individual may be gleaned from a tag associated with the media content. More particularly, an individual may have been explicitly tagged by an owner/uploader of the media content or the individual may have been dynamically tagged by an algorithm associated with a social media platform the media content was being uploaded to.

In an embodiment, the aspect may be one or more of a person, a pose, a location, an object, a viewpoint, and the like. In an embodiment, the identification of the aspect may be facilitated by first accessing a database (e.g., stored locally on a device, stored remotely on another device or server, etc.) comprising a listing of known aspects. Thereafter, an embodiment may analyze the media content (e.g., using one or more of a conventional image, audio, or text based analysis technique, etc.) to determine whether the media content comprises an aspect that shares a predetermined level of similarity to a known aspect in the database (e.g., greater than an 80% level of similarity, etc.). Responsive to determining that it does, an embodiment may conclude that the media content comprises a particular aspect.

As an example of the foregoing, an embodiment may be able to identify that a tagged individual is present in a photo with a notable individual (e.g., a celebrity, a politician, etc.). As another example, an embodiment may be able to identify that a tagged individual was captured in an unflattering pose in a video. In yet another example, an embodiment may be able to identify that an individual was present in a specific geographic location at a particular time. In yet another example, an embodiment may be able to identify a social or political viewpoint expressed by a tagged individual in a document.

At 302, an embodiment may determine whether the aspect is compatible with a listing of user permissions and/or user preferences delineated in a user profile associated with the tagged individual. In an embodiment, the user profile may be associated with the social media platform that the media content was uploaded to. More particularly, the tagged individual may have created an account associated with the relevant social media platform. The account may comprise a user profile in which the user designated various aspects, inter alia, that they did and/or did not wish to be associated with in uploaded content. Additionally or alternatively, in another embodiment, the user profile may be dynamically created by the system. Stated differently, in lieu of a user-created user profile, an embodiment may be able to dynamically construct an artificial user profile based upon analysis of available context data (e.g., user interaction data obtained from one or more websites, user communication data obtained from text messages or emails, online shopping data, etc.). The artificially created user-profile may contain a listing of inferred user preferences based upon the context data.

The determination of whether the presence of an aspect in media content is acceptable to a user may be facilitated by comparing the identified aspect(s) to the list of user permissions stored in the user profile. For example, a profile for User A may contain a preference that they do not wish to be tagged or publicly associated with any content attributable to Location L. Subsequently, if a video is uploaded to a social media platform in which User A was determined to be at Location L (e.g., by a caption, a geo-tag, through video analysis, etc.), an embodiment may determine that the video contains an incompatible aspect with respect to User A.

Responsive to determining, at 302, that the identified aspect is compatible with the user permissions, an embodiment may, at 303, take no additional action. Conversely, responsive to determining, at 302, that the identified aspect is not compatible with the user permissions, an embodiment may, at 304, perform a remedial action on the media content.

In an embodiment, the remedial action may be performed before or after the media content is uploaded to a social media platform. For example, with respect to the former, responsive to detecting that an uploader attempts to upload media content to a social media platform, an embodiment may perform the above processes on the media content and enact any necessary remedial measure on the content prior to the content being uploaded to the social media platform. As another example, with respect to the latter, an embodiment may enact the above processes when it is determined that a viewer is, or is about to view, the uploaded media content (e.g., by identifying that a viewer has clicked on a link to view the uploaded content, by detecting that a user scrolling down a page will have access to the uploaded content, etc.). Additionally or alternatively, an embodiment may periodically (e.g., once every week, once every month, etc.) compare the current permissions in the user profile against older uploaded content (e.g., posted by the user, posted by others, etc.) to ensure that aspects of older content are compatible with the present nature of the user profile.

Pluralities of examples of remedial actions are described below. It is important to note that the subsequent examples are not limiting and other remedial actions, not explicitly described here, may also be implemented. Additionally, more than remedial action may be implemented on a single piece of media content.

In an embodiment, the remedial action may be associated with a redaction of the aspect in the media content. For example, a profile associated with User A may indicate that User A does not wish to be publicly associated with alcoholic beverages. Accordingly, if an image is uploaded with User A standing next to a bar that contains a plurality of alcoholic beverages, an embodiment may dynamically censor or obscure the alcoholic beverages and/or User A in the image. Additionally, if a caption is associated with the image that states "good times at the bar with User A", an embodiment may redact or obscure User A's name in the caption. As another example, a profile associated with User A may indicate that User A does not wish to have their political opinions known. Accordingly, if an audio clip is uploaded in which User A expresses their political views on an issue, the portions of the audio clip associated with the expression may be censored (e.g., by a beep, another sound, no sound, etc.).

In an embodiment, the remedial action may be associated with a notification that is provided to an uploader of the media content. In an embodiment, the notification may provide an indication to the uploader that the media comprises content that may be incompatible with the permissions of an individual associated with the content. In an embodiment, the notification may be provided to the uploader when they attempt to upload the content to a social media platform.

In an embodiment, the remedial action may be associated with a filtering of content viewership. More particularly, an embodiment may dynamically limit the individuals that are allowed to view the uncensored media content to a particular subset. For example, an embodiment may limit viewership of the uncensored media content to a subset of a user's friends and/or family. The subset may be previously defined by the user or may be dynamically determined by the system.

In an embodiment, the remedial action may be a permission request from an individual associated with the content. More particularly, responsive to receiving an indication that an uploader desires to upload content that comprises content that is incompatible with the profile permissions of User A, an embodiment may, if contact information is available for User A, transmit a communication to User A requesting permission to upload the content. For example, a stock text message, email, or social media message may be sent to User A asking their permission to upload the relevant piece of media content. An embodiment may thereafter only allow the media content to be uploaded responsive to receiving approval from User A.

Responsive to detecting a change in the user profile that makes an incompatible aspect in media content compatible, an embodiment may dynamically remove any remedial measures taken against the media content. For example, responsive to identifying that a user no longer minds being associated with alcoholic content, an embodiment may remove any censors implemented against older content uploads in which alcohol was mentioned or displayed.

The various embodiments described herein thus represent a technical improvement to conventional methods for monitoring for content that may be incompatible with an associated user's preferences. Based on the foregoing processes, an embodiment may identify an aspect in media content that may be associated with a user. An embodiment may thereafter determine whether that aspect is compatible with the permissions/preferences delineated in the user's profile. Responsive to determining that the two are incompatible, an embodiment may perform a remedial action on the media content. Such a method may therefore dynamically address any issues present in media content before the media content is made publicly accessible to others.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   identifying one or more aspects present in media content uploaded to a social media platform, wherein the one or more aspects are associated with a user;
   determining, using a processor, that the one or more aspects are not compatible with user permissions delineated in a user profile associated with the user, wherein the determining comprises determining a particular aspect is present in the media content by determining the one or more aspects present in the media content share a predetermined level of similarity to one or more aspects stored in the user profile; and
   dynamically performing, responsive to determining that the one or more aspects of the media content are not compatible with the user permissions and without additional user input, a remedial action, wherein the performing the remedial action comprises redacting the one or more aspects in the media content on the social media platform.

2. The method of claim 1, wherein the identifying comprises identifying that the user is tagged in the media content.

3. The method of claim 1, wherein the user permissions are dynamically identified from available user context data.

4. The method of claim 1, wherein the media content comprises media content selected from the group consisting of an image, a video, an audio recording, and a text document.

5. The method of claim 1, wherein the performing the remedial action comprises performing responsive to receiving an upload request to a social media platform.

6. The method of claim 1, wherein the performing the remedial action comprises providing a notification to an uploader of the media content that the one or more aspects of the media content is not compatible with the user permissions for the user.

7. The method of claim 1, wherein the performing the remedial action comprises filtering access to the media content to a subset of individuals.

8. The method of claim 1, wherein the performing the remedial action comprises contacting the user for permission to upload the media content.

9. The method of claim 1, wherein the one or more aspects are associated with at least one of: a person, a location, an object, and a viewpoint.

10. An information handling device, comprising:
a processor;
a memory device that stores instructions executable by the processor to:
identify one or more aspects present in media content uploaded to a social media platform, wherein the one or more aspects are associated with a user;
determine whether the one or more aspects are compatible with user permissions delineated in a user profile associated with the user, wherein to determine comprises determining a particular aspect is present in the media content by determining the one or more aspects present in the media content share a predetermined level of similarity to one or more aspects stored in the user profile; and
dynamically perform, responsive to determining that the one or more aspects of the media content are not compatible with the user permissions and without additional user input, a remedial action, wherein the performing the remedial action comprises redacting the one or more aspects in the media content on the social media platform.

11. The information handling device of claim 10, wherein the instructions executable by the processor to identify comprise instructions executable by the processor to identify that the user is tagged in the media content.

12. The information handling device of claim 10, wherein the user permissions are dynamically identified from available user context data.

13. The information handling device of claim 10, wherein the media content comprises media content selected from the group consisting of an image, a video, an audio recording, and a text document.

14. The information handling device of claim 10, wherein the instructions executable by the processor to perform the remedial action comprise instructions executable by the processor to perform the remedial action responsive to receiving an upload request to a social media platform.

15. The information handling device of claim 10, wherein the instructions executable by the processor to perform the remedial action comprise instructions executable by the processor to provide a notification to an uploader of the media content that the one or more aspects of the media content is not compatible with the user permissions for the user.

16. The information handling device of claim 10, wherein the instructions executable by the processor to perform the remedial action comprise instructions executable by the processor to filter access to the media content to a subset of individuals.

17. The information handling device of claim 10, wherein the instructions executable by the processor to perform the remedial action comprise instructions executable by the processor to contact the user for permission to upload the media content.

18. A product, comprising:
a storage device that stores code, the code being executable by a processor and comprising:
code that identifies one or more aspects present in media content uploaded to a social media platform, wherein the one or more aspects are associated with a user;
code that determines whether the one or more aspects compatible with user permissions delineated in a user profile associated with the user, wherein the code that determines comprises code that determines a particular aspect is present in the media content by determining the one or more aspects present in the media content share a predetermined level of similarity to one or more aspects stored in the user profile; and
code that dynamically performs, responsive to determining that the one or more aspects of the media content are not compatible with the user permissions and without additional user input, a remedial action, wherein the performing the remedial action comprises redacting the one or more aspects in the media content on the social media platform.

* * * * *